US006873251B2

(12) United States Patent
Schiffmann et al.

(10) Patent No.: US 6,873,251 B2
(45) Date of Patent: Mar. 29, 2005

(54) TRACKING SYSTEM AND METHOD EMPLOYING MULTIPLE OVERLAPPING SENSORS

(75) Inventors: Jan K. Schiffmann, Newbury Park, CA (US); Lawrrence C Hau, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 208 days.

(21) Appl. No.: 10/196,631

(22) Filed: Jul. 16, 2002

(65) Prior Publication Data

US 2004/0012516 A1 Jan. 22, 2004

(51) Int. Cl.$^7$ ................................................. B60Q 1/00
(52) U.S. Cl. ....................... 340/436; 340/435; 340/901; 340/902; 340/903; 340/905; 342/70; 342/59; 342/118
(58) Field of Search ................................. 340/436, 435, 340/901, 902, 903, 905; 701/300, 301, 208, 214; 342/70, 59, 118, 36; 180/167, 169

(56) References Cited

U.S. PATENT DOCUMENTS

| | | | |
|---|---|---|---|
| 5,249,157 A | | 9/1993 | Taylor ........................ 340/903 |
| 5,263,241 A | | 11/1993 | Hart, Jr. et al. |
| 5,377,403 A | | 1/1995 | Hart, Jr. et al. |
| 6,002,974 A | | 12/1999 | Schiffmann .................. 701/36 |
| 6,031,484 A | * | 2/2000 | Bullinger et al. ............. 342/72 |
| 6,055,042 A | * | 4/2000 | Sarangapani ............... 356/4.01 |
| 6,067,110 A | * | 5/2000 | Nonaka et al. ............. 348/148 |
| 6,085,151 A | * | 7/2000 | Farmer et al. .............. 701/301 |
| 6,727,844 B1 | * | 4/2004 | Zimmermann et al. ....... 342/70 |

OTHER PUBLICATIONS

Song, T. L., "Observability of Target Tracking with Range–Only Measurements," IEEE Journal Oceanic Engineering, vol. 24, No. 3, Jul. 999, pp. 383–387.

Reif, K., Günther, S., Yaz, E., "Stochastic Stability of the Discrete–Time Extended Kalman Filter," IEEE Trans. Automatic Control, vol. 44, No. 4, Apr. 1999, pp. 714–728.

Julier, S., Uhlmann, J., "A New Extension of the Kalman Filter to Nonlinear Systems," Proc. Of AeroSense: The 11th Int. Symp. On Aerospace/Defense Sensing, Simulation and Controls, 1997, 12 pages.

De Geeter, J., Van Brussel, H. De Schutter, J., "A Smoothly Constrained Kalman Filter," IEEE Trans. Pattern Analysis and Machine Intelligence, vol. 19, No. 10, Oct. 1997, pp. 1171–1177.

Gordon, J., Salmond, D., Smith, A., "Novel Approach to Nonlinear/Non–Gaussian Bayesian State Estimation," IEE Proceedings–F, vol. 140, No. 2, Apr. 1993, pp. 107–113.

Richards, P., "Constrained Kalman Filtering Using Pseudo–Measurements," IEE Colloquium on Target Tracking, 1995, pp. 75–79.

Massicotte, D., Morawski, R., Barwicz, A., "Incorporation of a Positivity Constraint into a Kalman–Filter–Based Algorithm for Correction of Spectrometric Data," IEEE Trans. Instrumentation and Measurement, vol. 44, No. 1, Feb. 1995.

* cited by examiner

*Primary Examiner*—Hung T. Nguyen
(74) *Attorney, Agent, or Firm*—Stefan V. Chmielewski

(57) ABSTRACT

A tracking system and method of estimating position and velocity of an object are provided. The tracking system includes first and second sensors for sensing an object in first and second fields of view, respectively. The first and second fields of view partially overlap to provide an overlapping coverage zone. Each of the sensors measures range and range rate of the object. The system further includes a controller for estimating position and velocity of the object as a function of the measured range and range rate signals, without requiring sensing of the azimuth angle of the object.

17 Claims, 5 Drawing Sheets

TRACKING SYSTEM AND METHOD EMPLOYING MULTIPLE OVERLAPPING SENSORS

TECHNICAL FIELD

The present invention generally relates to the detection and tracking of an object and, more particularly, relates to a vehicle tracking system and method of estimating position and velocity of an object.

BACKGROUND OF THE INVENTION

Automotive vehicles are increasingly being equipped with collision avoidance and warning systems for predicting the potential collision with an external object, such as another vehicle or a pedestrian. Upon detecting a potential collision, such systems typically initiate an action to avoid the collision and/or provide a warning to the vehicle operator. Adaptive cruise control systems have been proposed to track a leading vehicle and automatically control the speed of the following vehicle. The ability to accurately predict an upcoming collision also enables a vehicle controller to deploy safety-related devices on the vehicle. For example, upon predicting an anticipated collision or near collision with an object, the vehicle seat belt pretensioner could be activated in a timely manner to pretension the seat belt, thereby enhancing the application of the safety device. The controller could also deploy a warning signal to notify the vehicle driver of a predicted collision with an object.

In conventional vehicle target tracking systems, the host vehicle is generally equipped with a sensor arrangement that acquires range, range rate, and azimuth angle (i.e., direction to target) measurements for each tracked target within a field of view. The sensor arrangement employed in many conventional tracking systems generally includes a plurality of radar beams or laser beams covering a field of view. In order to track an object, the conventional vehicle target tracking system generally senses the presence of an object, measures the azimuth angle of the object, range to the object, and range rate of the object, all relative to the host vehicle, and tracks movement of the sensed object.

The above-mentioned target tracking systems generally require relative complex and expensive sensor arrangements with several sensors that measure the azimuth angle of the object, relative to the host vehicle, in addition to obtaining range and range rate measurements. The measurement of azimuth angle provides for an indication of the direction from which the target object is approaching, however, conventional azimuth angle measurements generally require expensive and costly sensor arrangements. It is generally desirable to reduce the complexity and cost of systems and components employed in automotive vehicles. It is therefore desirable to provide for a reduced complexity and reduced cost system that is able to track an object.

SUMMARY OF THE INVENTION

In accordance with the teachings of the present invention, a tracking system and method of tracking an object are provided. According to one aspect of the present invention, the tracking system includes a first sensor for sensing an object in a first field of view and measuring range to the object and range rate of the object. The tracking system also includes a second sensor for sensing the object in a second field of view and measuring range to the object and range rate of the object. The first and second sensors are provided such that the first field of view overlaps the second field of view to provide an overlapping coverage zone. The tracking system further includes a controller for estimating position and velocity of the object based on the sensed range and range rate measurements from the first and second sensors when the object is in the overlapping coverage zone.

According to another aspect of the present invention, a method of tracking an object is provided. The method includes the steps of sensing the presence of an object in first and second overlapping fields of view with first and second sensors. The first field of view and second field of view overlap to provide an overlapping coverage zone. The method also includes the steps of measuring range to the object in the first field of view with the first sensor, and measuring range to the object in the second field of view with the second sensor. The method also includes the steps of determining range rate of the object with the first sensor in the first field of view, and determining range rate of the object with the second sensor in the second field of view. The method estimates position of the object based on the sensed range and range rate measurements when the object is in the overlapping coverage zone, and further estimates velocity of the object based on the sensed range and range rate measurements when the object is in the overlapping coverage zone.

Accordingly, the tracking system and object tracking method of the present invention advantageously estimate a position and velocity of an object without requiring a complex and costly sensor arrangement, such as those which measure an azimuth angle of the object.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
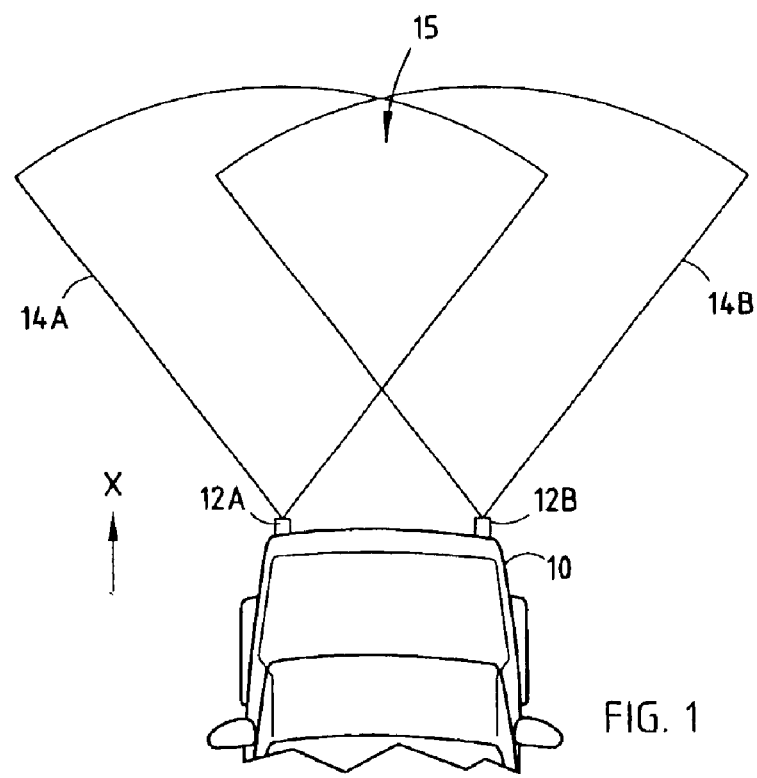
FIG. 1 is a plan view illustrating the geometry of a sensor arrangement for a vehicle tracking system according to the present invention.

Referring to FIG. 1, an automotive vehicle 10 is generally illustrated having an object tracking system for detecting and tracking an object, and may be useful for avoiding collision of the object with the host vehicle 10. The tracking system includes a plurality of overlapping radar sensors 12A and 12B mounted to the vehicle 10 to cover a desired field of view in front of the vehicle. According to the embodiment shown, the tracking system has two radar sensors 12A and 12B located on opposite corners of the front of the vehicle 10. Radar sensor 12A detects objects within a first field of view 14A, and radar sensor 12B detects objects within a second field of view 14B. The radar sensors 12A and 12B are arranged so that the first and second fields of view 14A and 14B partially overlap to provide an overlapping coverage zone 15. The fields of view 14A and 14B also have non-overlapping regions.

The tracking system senses and tracks one or more objects, such as a moving target, and estimates the position and velocity of the sensed target object, relative to the host vehicle 10. By estimating the current position and velocity of the target object within the overlapping coverage zone 15, the host vehicle 10 is able to track the object moving through the overlapping coverage zone 15 as well as through non-overlapping fields of view. It should be appreciated that the estimated position and velocity may be useful in tracking an object for purposes of determining collision detection and avoidance, such that responsive action may be taken to avoid a collision or to minimize the effects of a collision.

Figure 2:
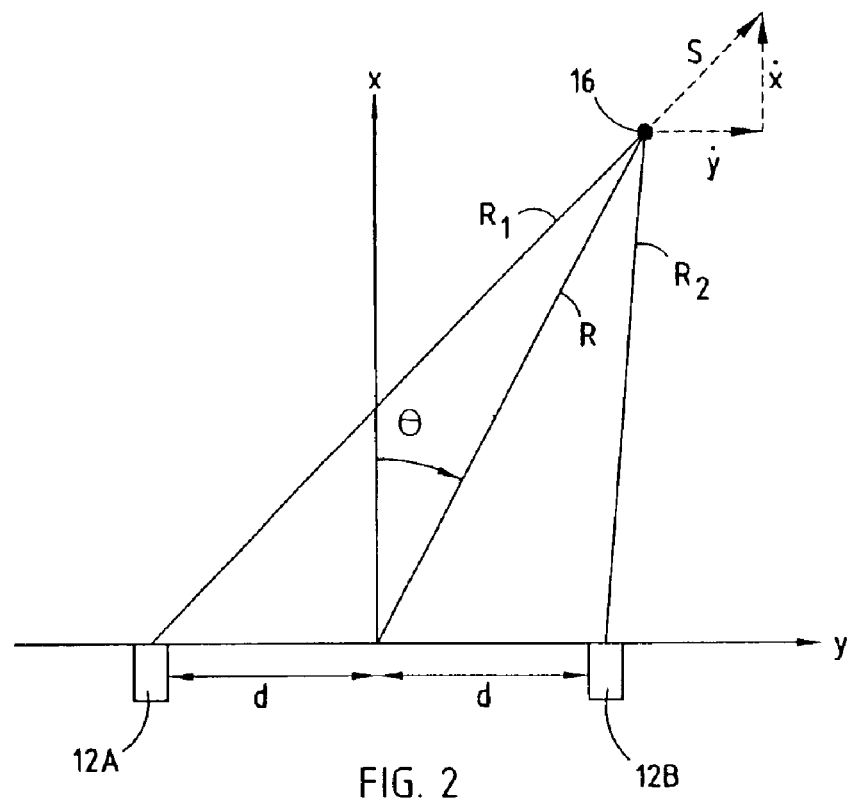
FIG. 2 is a plan view further illustrating the geometry of the tracking system for tracking a target object.

The sensor arrangement includes at least a pair of sensors 12A and 12B arranged to define overlapping and non-overlapping coverage zones to sense the presence of one or more objects. Each of sensors 12A and 12B tracks the relative movement of each sensed object within fields of view 14A and 14B. Each of sensors 12A and 12B measures the range (radial distance) R1 and R2, respectively, as shown in FIG. 2, to a target object 16, measures the range rate (time rate of change of radial distance) $\dot{R}1$ and $\dot{R}2$ of target object 16, and further measures the received return radar signal amplitude A. The range R is the estimated radial distance between the host vehicle 10 and the object 16, and R1 and R2 represent the sensed range from sensors 12A and 12B, respectively. The range rate $\dot{R}$ is the estimated rate of change of the range R of the object 16 as a function of time relative to the host vehicle 10. The signal amplitude A is the amplitude of the reflected and returned radar signal received at each sensor. Sensors 12A and 12B may each be a Doppler radar sensor that determines range rate $\dot{R}$ based on the radar Doppler effect. Sensors 12A and 12B may each include a commercially available off-the-shelf wide-beam staring microwave Doppler radar sensor. However, it should be appreciated that other object detecting sensors including other types of radar sensors, video imaging cameras, and laser sensors may be employed to detect the presence of an object, track the relative movement of the detected object, and determine the range and range rate measurements R and $\dot{R}$ and signal amplitudes A which, in turn, are processed to estimate the position and velocity of the target object 16.

The object tracking system and method of the present invention advantageously determines the position and velocity of the target object 16 as a function of the range R, range rate $\dot{R}$, and signal amplitude A received at sensors 12A and 12B, without the requirement of acquiring an angular azimuth measurement of the object 16. Thus, the target tracking system of the present invention is able to use a reduced complexity and less costly sensing arrangement. While a pair of sensors 12A and 12B are shown, it should be appreciated that any number of two or more sensors may be employed and may provide multiple overlapping fields of view (overlapping coverage zones).

The tracking system estimates the position and velocity of the target object 16 when the object 16 is in the overlapping coverage zone 15 sensed by multiple sensors, and continues to track the object 16 as it moves through the overlapping coverage zone 15 and non-overlapping zones within the first and second fields of view 14A and 14B. When the target object 16 is in the overlapping coverage zone 15, an extended Kalman filter is employed to estimate the position and velocity of the object 16 using range and range rate triangulation and a signal amplitude ratio $A_R$. When the object 16 is outside of the overlapping coverage zone 15, but remains within one of the first and second fields of view 14A and 14B, the object tracking system continues to track the object 16 by employing a single beam tracking algorithm using the current measurements and the last known position and velocity when in the overlapping coverage zone 15. This single beam tracking algorithm may estimate an azimuth angular rate using range and range rate measurements.

In order to track an object in the overlapping coverage zone 15, the present invention may assume that the object 16 is a point reflector. As shown in FIG. 2, the sensors 12A and 12B are separated by a distance 2d which, in a vehicle application, is typically limited to the width of the vehicle 10. The angle θ may be determined as a function of the range and amplitude of the signals received by sensors 12A and 12B. The received amplitude measurements of sensors 12A and 12B are processed as follows. Using a point reflector move to varying locations in the overlapping coverage zone 15 of the two sensors 12A and 12B, and construct a lookup table which maps range R and amplitude ratio $A_R$ into azimuth angle of the object 16. Amplitude ratio $A_R$ refers to the ratio of the sensed amplitudes of the received signal returns from the two sensors 12A and 12b. A synthetic measurement (estimation) of azimuth angle may thus be constructed from the two amplitude measurements for a given target range. Synthetic measurements of position coordinates (x, y) are then constructed using the azimuth angle and the estimated range midway between sensors 12A and 12B. The synthetic measurements of position coordinates are compared to the current position estimates, and the filter state variables are updated accordingly. Thus, the range R, range rate $\dot{R}$, and received signal amplitude A measurements from the two sensors 12A and 12B are used to measurement update the filter states.

Since the relationship between the state variables and the predicted measurements are not linear, a non-linear filter, preferably an extended Kalman filter, is used. It should be appreciated that other non-linear filters could be employed, such as an unscented Kalman filter or a particle filter. The measurement noise covariance matrix, which statistically describes the anticipated errors in the various measurements, is used to tune the filter response to range, range rate, and received signal amplitude measurements. The extended Kalman filter further provides a time update which describes how the state variables are believed to evolve in time. The state variables are two position coordinates x and y and two velocity components $\dot{x}$ and $\dot{y}$. The position states evolve in the usual linear way according to the corresponding velocities. The velocities are modeled as random walks which are roughly constant but change slowly. A process noise covariance matrix describes the levels of the uncertainties in the above model and, in particular, allows for tuning. Mathematical models of process dynamics and measurements are shown and described herein.

Figure 3:
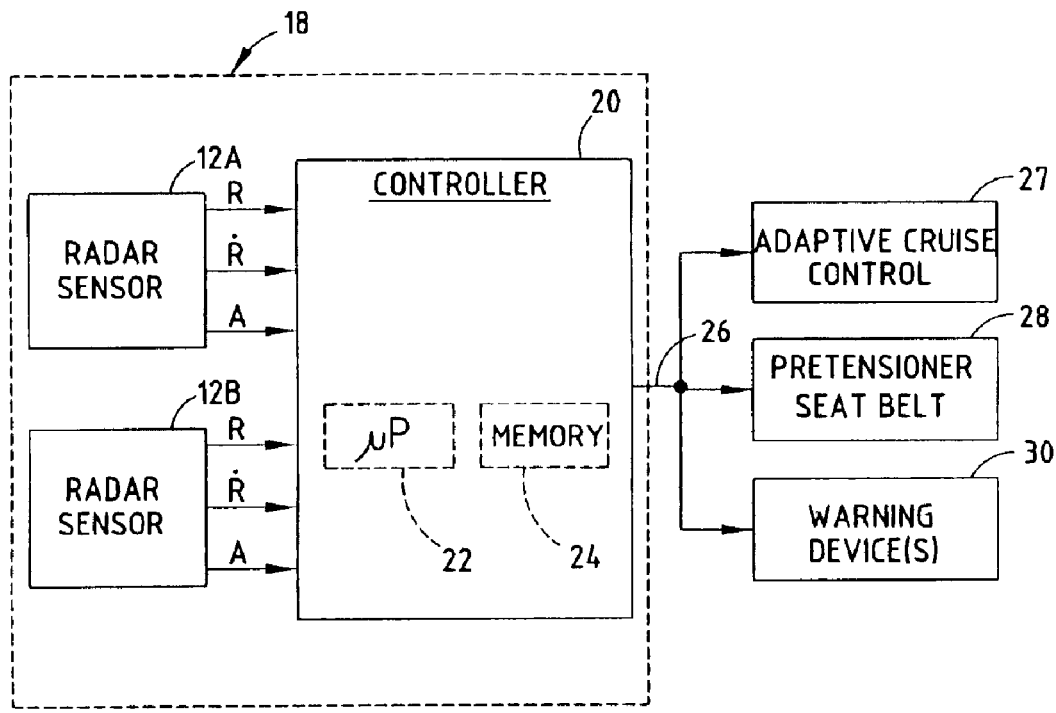
FIG. 3 is a block diagram illustrating the vehicle tracking system.

Referring to FIG. 3, the object tracking system 18 is shown including radar sensors 12A and 12B and a controller 20. Controller 20 preferably includes a microprocessor-based controller having a microprocessor 22 and memory 24. Memory 24 may includes random access memory (RAM), read-only memory (ROM), and electrically erasable programmable read-only memory (EEPROM). Controller 20 may be a commercially available off-the-shelf controller and may be dedicated to target tracking, adaptive cruise control or crash processing, according to some examples, or may share processing capability with other vehicle functions.

The controller 20 receives the range measurement R, range rate measurement $\dot{R}$, and signal amplitude A from each of radar sensors 12A and 12B, and processes the received signals with one or more target tracking routines to determine the position and velocity of the target object 16 relative to the host vehicle 10. The target tracking routine(s) may further process the estimated position and velocity to determine whether a potential collision of the target object 16 with the host vehicle 10 may occur or to control some other vehicle function. A controller 20 may generate output signals 26 that may be made available for various systems on the vehicle including an adaptive cruise control system 27, a seat belt pretensioner 28, and various warning devices 30. The adaptive control cruise control system 27 may employ the estimated position and velocity of the object 16 to control the speed of the host vehicle 10. The seat belt pretensioner 28 may be controlled to pretension the seat belt just prior to an anticipated vehicle collision to eliminate slack in the restraining device. The output signal 26 may further be provided to one or more warning devices 30 to warn the vehicle operator and occupants of any anticipated vehicle collision. It should be appreciated that other devices may be employed including vehicle air bags, pop-up roll bars, and other safety related devices.

Figure 4:
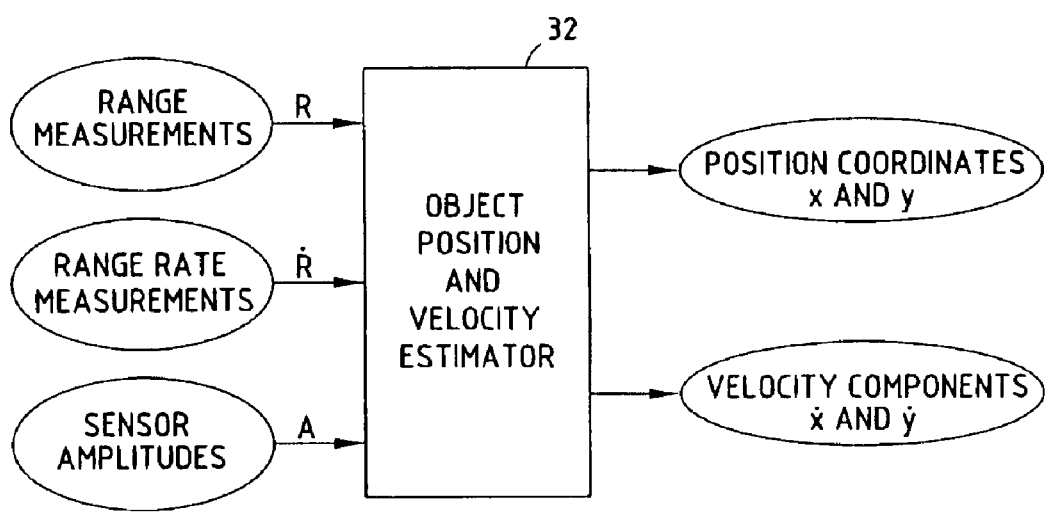
FIG. 4 is a block diagram illustrating an object position and velocity estimator of the tracking system.
Figure 5:
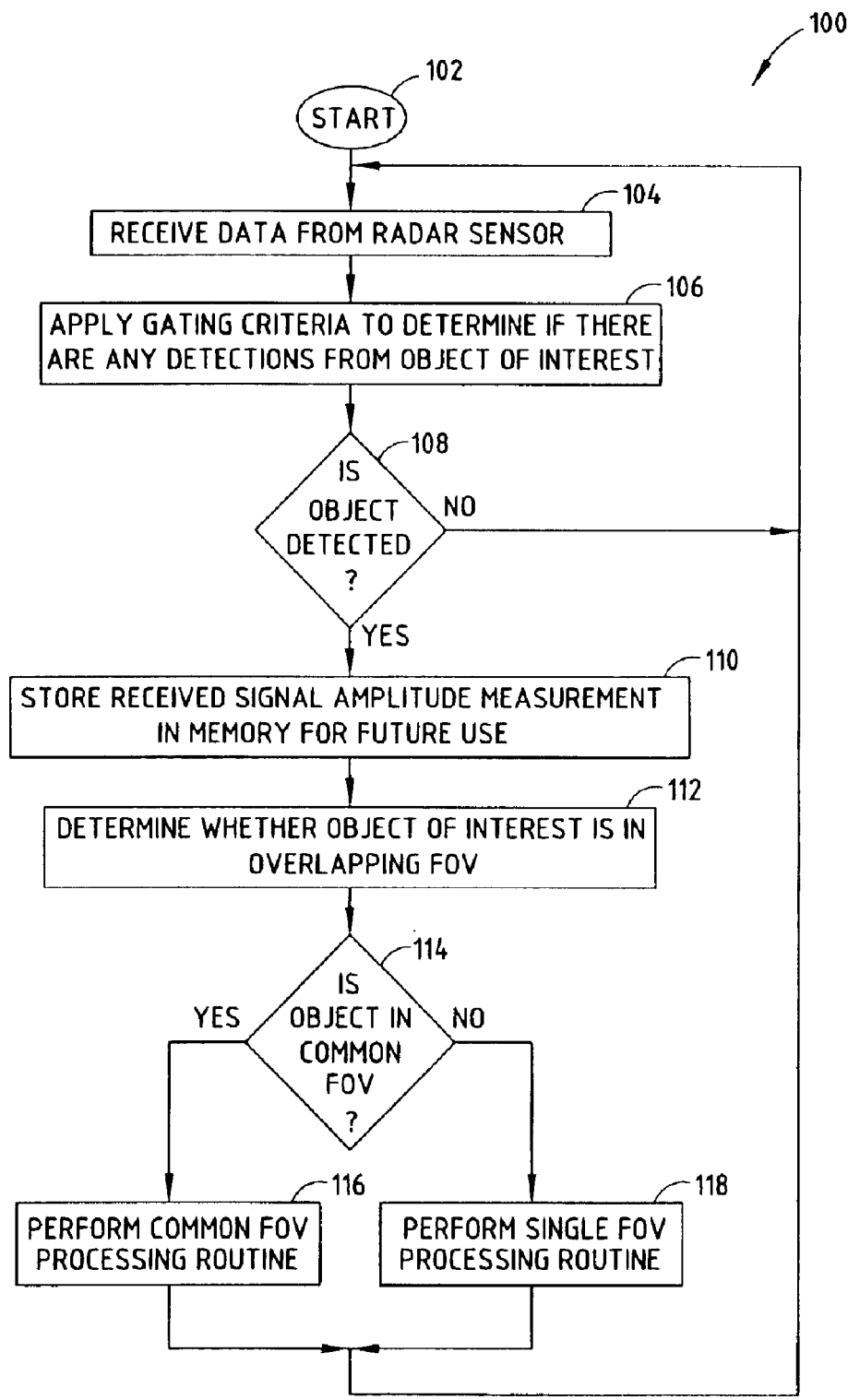
FIG. 5 is a flow diagram illustrating a routine for tracking an object according to the present invention.
Figure 6:
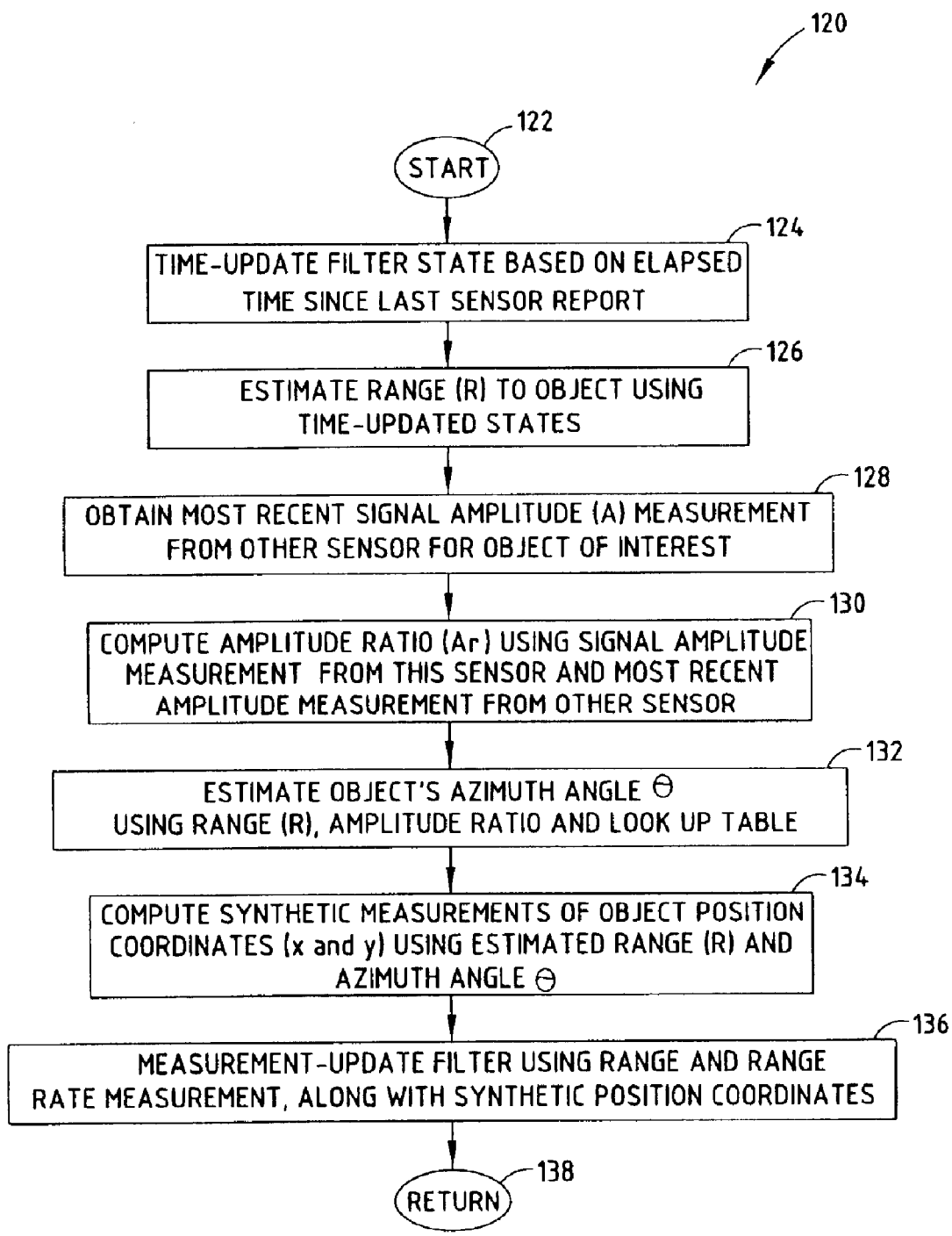
FIG. 6 is a flow diagram illustrating a routine for estimating object position and velocity when the object is in an overlapping coverage zone.
Figure 7:
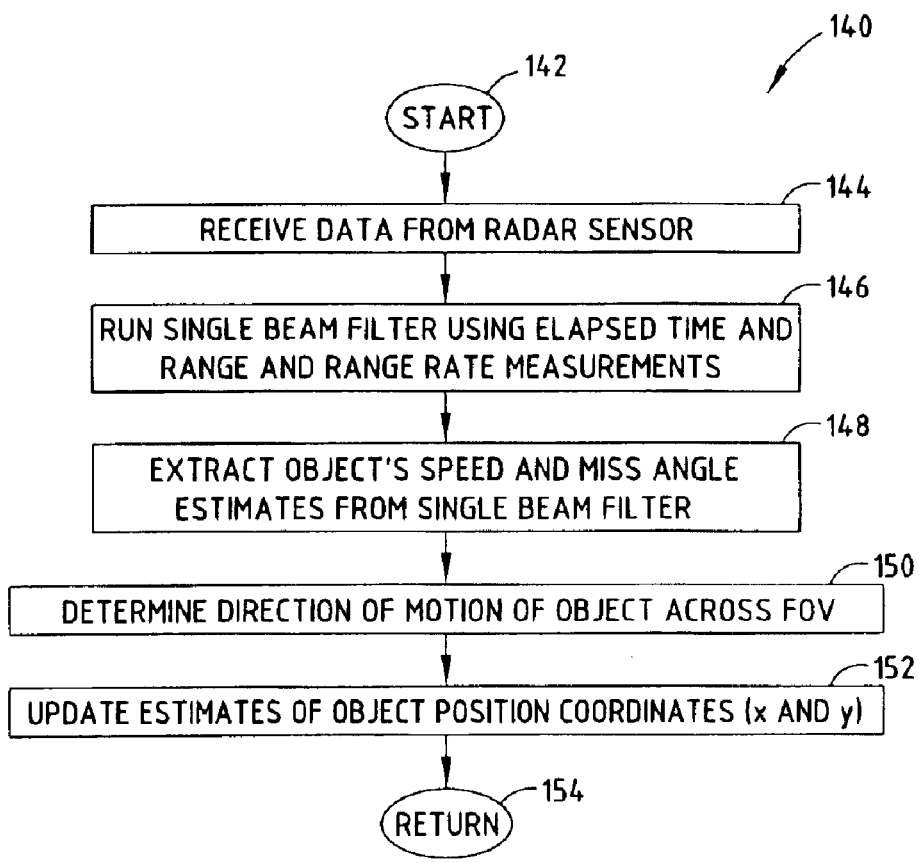
FIG. 7 is a flow diagram illustrating a routine for estimating object position and velocity when the object travels in a sensor field of view outside of the overlapping coverage zone.

Referring to FIG. 4, an object position and velocity estimator 32 is generally shown receiving the range measurements R, range rate measurements $\dot{R}$, and amplitude A measurements from both of sensors 12A and 12B. The range R, range rate $\dot{R}$, and amplitude A measurements are processed by the estimator 32, which includes programmed routines, as shown in FIGS. 5–7 and described in more detail below, to estimate the position and velocity of the target object 16.

When the target object 16 is located within the overlapping coverage zone 15, an extended Kalman filter is employed to estimate the object position coordinates x and y and to estimate the velocity components $\dot{x}$ and $\dot{y}$ of the object 16. The non-linear extended Kalman filter inputs a sequence of measurements and, at each measurement time k, k+1, k+2, etc., estimates of the target object attributes for position and velocity at the current time k are updated. The estimation problem for the non-linear extended Kalman filter is explained below with the filter state model, process dynamics model, and measurement model.

Filter State Model $$\bar{x} = \begin{bmatrix} x \\ \dot{x} \\ y \\ \dot{y} \end{bmatrix}$$

where x is the downrange position coordinate of target object, $\dot{x}$ is the downrange relative velocity component of target object, y is the crossrange position coordinate of target object, and $\dot{y}$ is the crossrange relative velocity component of target object.

Process Dynamics Model $$\bar{x}_{k+1} = F\bar{x}_k + \bar{w}_k$$

$$\text{where } F = \begin{bmatrix} 1 & T & 0 & 0 \\ 0 & 1 & 0 & 0 \\ 0 & 0 & 0 & T \\ 0 & 0 & 0 & 1 \end{bmatrix}$$

and $\bar{w}_k$ is a zero-mean random vector (process noise) having covariance $$Q = \begin{bmatrix} \frac{\sigma_x T^3}{3} & \frac{\sigma_x T^2}{2} & 0 & 0 \\ \frac{\sigma_x T^2}{2} & \sigma_x T & 0 & 0 \\ 0 & 0 & \frac{\sigma_y T^3}{3} & \frac{\sigma_y T^2}{2} \\ 0 & 0 & \frac{\sigma_y T^2}{2} & \sigma_y T \end{bmatrix}$$

wherein $\sigma_x, \sigma_y$ are calibrations, subscripts k and k+1 refer to discrete time instants, and T is the elapsed time between instants k and k+1.

Measurement Model

Sensor 12A:

$R1 = \sqrt{x^2 + (y+d)^2} + v_1$ (Range from sensor 12A)

$\dot{R}1 = \frac{x\dot{x} + (y+d)\dot{y}}{\sqrt{x^2 + (y+d)^2}} + v_2$ (Range rate from sensor 12A)

$R\cos\theta = x + v_3$ (Synthetic measurement of downrange coordinate)

$R\sin\theta = y + v_4$ (Synthetic measurement of crossrange coordinate)

where $$R = \sqrt{x^2 + y^2}$$

is the estimated range from the origin of coordinates, θ is obtained from lookup table using estimated range R and amplitude ratio $A_R$ of two most recent signal amplitude measurements from sensors 12A and 12B, and $\bar{v}$ is a zero-mean random vector representing measurement errors having covariance as shown below.

$$\bar{v} = \begin{bmatrix} v_1 \\ v_2 \\ v_3 \\ v_4 \end{bmatrix}$$

Sensor 12B:

$R2 = \sqrt{x^2 + (y-d)^2} + v_1$ (Range from sensor 12B)

$\dot{R}2 = \frac{x\dot{x} + (y-d)\dot{y}}{\sqrt{x^2 + (y-d)^2}} + v_2$ (Range rate from sensor 12B)

| | |
|---|---|
| $R\cos\theta = x + v_3$ | (Synthetic measurement of downrange coordinate) |
| $R\sin\theta = y + v_4$ | (Synthetic measurement of crossrange coordinate) | where $$R = \sqrt{x^2 + y^2}$$

is the estimated range from the origin of coordinates, $\theta$ is obtained from lookup table using estimated range R and amplitude ratio $A_R$ of two most recent signal amplitude measurements from sensors 12A and 12B, and $\underline{v}$ is a zero-mean random vector representing measurement errors having covariance as shown below.

$$v = \begin{bmatrix} v_1 \\ v_2 \\ v_3 \\ v_4 \end{bmatrix}$$

When the target object 16 leaves the overlapping coverage zone 15 and remains within one of the field of views 14A and 14B, the target object 16 may be further tracked based on the last known position and velocity estimations of the object 16. This may be accomplished by employing a single field of view tracking routine which may include one of the routines disclosed in either of pending U.S. application Ser. No. 10/158,550, filed on May 30, 2002, entitled "COLLISION DETECTION SYSTEM AND METHOD OF ESTIMATING MISS DISTANCE," and U.S. application Ser. No. 10/159,959, filed on May 30, 2002, entitled "COLLISION DETECTION SYSTEM AND METHOD OF ESTIMATING MISS DISTANCE EMPLOYING CURVE FITTING," the entire disclosures of which are hereby incorporated herein by reference. The techniques described in the aforementioned applications can determine the azimuth angular rate of a target object using range and range rate measurements by estimating the range and speed of the object along with the magnitude of a miss angle which is the angle between the radar sensor to the object and the object's velocity vector. Given the last known position and velocity of the object 16 acquired in the overlapping coverage zone 15, the trajectory of the object 16 can be estimated until the object leaves the fields of view 14A and 14B.

Referring to FIG. 5, a routine 100 is illustrated for estimating the position and velocity of the target object according to the present invention. Routine 100 begins at step 102 and proceeds to step 104 to receive the sensor measurement data from one of the radar sensors. Next, in step 106, the routine 100 applies gating criteria to determine if there is detection of an object of interest from the field of view of the radar sensor. In decision step 108, routine 100 determines if an object is detected by the radar sensor and, if not, returns to step 104. If an object is detected by the radar sensor, routine 100 proceeds to step 110 to store in memory the amplitude A measurement of the returned radar signal received by the radar sensor. Next, routine 100 determines whether the object of interest is in an overlapping field of view (FOV) coverage zone for multiple radar sensors in step 112. In decision step 114, routine 100 decides which processing routine is performed based on whether the object detected is determined to be within the overlapping FOV coverage zone. If the object detected is within an overlapping FOV coverage zone, routine 100 proceeds to step 116 to perform a common FOV processing routine, as described in connection with FIG. 6, before returning to the beginning of routine 100. If the object detected is not within the overlapping coverage zone, routine 100 proceeds to perform a single FOV processing routine in step 118, which is shown in FIG. 7, before returning to the beginning of routine 100. Routine 100 is repeated each loop so that new data from one of sensors 12A and 12B is introduced during one loop and the new data from the other sensors 12A and 12B is introduced during the next loop.

Referring to FIG. 6, the common field of view processing routine 120 is shown beginning at step 122 and proceeding to step 124 to time-update the extended Kalman filter state based on an elapsed time since the last sensor report. Next, in step 126, routine 120 estimates the range R to the object using the time-updated states. Routine 120 then obtains the most recent signal amplitude A measurements from the other sensor for the same object of interest in step 128.

In step 130, common FOV processing routine 120 computes the amplitude ratio $A_R$ using amplitude measurements A from the current sensor and the most recent amplitude measurement A from the other sensor for the same object of interest. Thus, the amplitude ratio $A_R$ is based on the most recently acquired data. In step 132, routine 120 estimates the azimuth angle $\theta$ of the object using range R, the amplitude ratio $A_R$, and a lookup table. Proceeding to step 134, routine 120 computes synthetic measurements (estimations) of object position coordinates x and y using the estimated range R and azimuth angle $\theta$. Finally, in step 136, routine 120 measurement-updates the filter using range R and range rate $\dot{R}$ measurements along with the synthetic position coordinates x and y before returning in step 138.

Accordingly, the common field of view processing routine 120 estimates the position coordinates x and y and velocity components $\dot{x}$ and $\dot{y}$ of an object 16 by employing an extended Kalman filter based on the sensed range R, range rate $\dot{R}$, and signal amplitude A measurements acquired from at least two radar sensors when the target object 16 is within the overlapping coverage zone 15. When the target object 16 leaves the overlapping coverage zone 15 and remains within one of the non-overlapping fields of view 14A and 14B, the single field of view processing routine 140 may be performed as shown in FIG. 7.

Referring to FIG. 7, single FOV processing routine 140 starts at step 142 and proceeds to step 144 to receive sensor measurement data from a radar sensor. Next, in step 146, routine 140 runs a single beam filter using the elapsed time and range R and range rate $\dot{R}$ measurements as acquired from the appropriate radar sensor covering the single FOV of interest. Routine 140 then extracts the object's speed and miss angle estimates from the single beam filter in step 148 and determines direction of motion of the object across the field of view in step 150. Finally, in step 152, routine 140 updates the estimates of object position coordinates x and y before returning in step 154.

Figure 8:
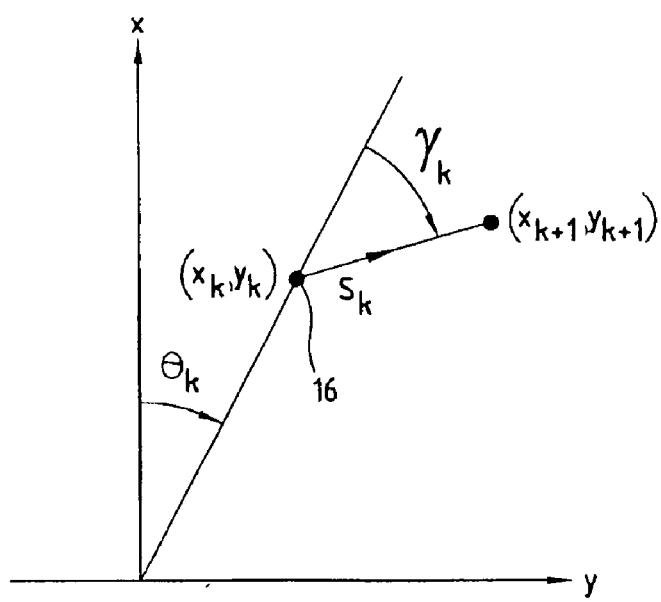
FIG. 8 is a plan view further illustrating the geometry of tracking the object in a single field of view.

An example of the geometry for tracking an object 16 in a non-overlapping field of view with a single field of view tracking algorithm is shown in FIG. 8. The target 16 is shown at different time periods k and k+1. At time period k, object 16 has position coordinates $x_k$ and $y_k$. As the object 16 travels during an elapsed time period, object 16 has time-updated position coordinates $X_{k+1}$ and $Y_{k+1}$. The object 16 has a magnitude of target velocity vector $S_k$ and the target object has a miss angle at time k of $\gamma_k$. The single field of view processing algorithm is able to update the position coordinates x and y of the object based on the object speed $S_k$ and miss angle $\gamma_k$ estimates for each consecutive time period increment.

It should be appreciated that the single field of view processing routine 140 may employ any of a number of algorithms for tracking a target object through a single field of view of a sensor once the position and velocity of the object are obtained as described herein. Examples of single field of view processing techniques are disclosed in pending U.S. application Ser. Nos. 10/158,550 and 10/159,959, both filed on May 30, 2002.

It should be appreciated that the extended Kalman filter may be designed and implemented to estimate the position and velocity of the target object by employing the state variables, the process model, and the measurement model as described above. In addition, standard models of process and measurement noise could be employed. The extended Kalman filter may be implemented in various forms such as a smoother or a non-linear filter which is based on the selection of physical quantities to be represented by state variables in the filter, the dynamic models chosen to represent the interaction and time-evolution of the state variables, and the measurement model chosen to represent how the available measurements are related to the values taken by the physical quantities represented in the state variables. The extended Kalman filter handles non-linearities in the models, particularly in the measurement model. It should be appreciated that extended Kalman filters have been employed in automotive applications such as vehicle rollover sensing as disclosed in U.S. Pat. No. 6,002,974, entitled "VEHICLE ROLLOVER SENSING USING EXTENDED KALMAN FILTER," the disclosure of which is hereby incorporated herein by reference.

Accordingly, the object tracking system 18 and method 100 of estimating position and velocity of an object according to the present invention advantageously estimates the position coordinates x and y of a target object 16 and the velocity components $\dot{x}$ and $\dot{y}$ of object 16 without requiring the measurement of an azimuth angle of the object 16. As a consequence, the present invention is able to employ less complex and less expensive sensing components, thus providing cost savings.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A tracking system for tracking an object comprising:
    a first sensor for sensing an object in a first field of view and measuring range to the object, range rate of the object, and amplitude of a received signal from the object;
    a second sensor for sensing the object in a second field of view and measuring range to the object, range rate of the object, and amplitude of a received signal from the object, wherein the first field of view partially overlaps the second field of view to provide an overlapping coverage zone; and
    a controller for estimating azimuth angle based upon the sensed ranges and the ratio of the sensed amplitudes and for estimating position and velocity of the object based on the estimated azimuth angle, the sensed range and range rate measurements from the first and second sensors when the object is in the overlapping coverage zone.

2. The tracking system as defined in claim 1, wherein the controller further tracks movement of the object through one of the first and second fields of view outside of the overlapping coverage zone.

3. The tracking system as defined in claim 2, wherein the controller tracks movement of the object through said one of the first and second fields of view as a function of the estimated position and velocity of the object.

4. The tracking system as defined in claim 1, wherein the controller estimates the position and velocity of the object by employing a non-linear filter.

5. The tracking system as defined in claim 1, wherein the controller estimates the position and velocity of the object by employing an extended Kalman filter.

6. The tracking system as defined in claim 1, wherein the first and second sensors each comprises a radar sensor.

7. The tracking system as defined in claim 6, wherein the first and second sensors each comprises a Doppler radar sensor, wherein the range rate measurement is determined based on a Doppler effect.

8. The tracking system as defined in claim 1, wherein the first and second sensors are located on a vehicle and the controller tracks the position and velocity of the object relative to the vehicle.

9. A method of tracking an object, said method comprising the steps of:
    sensing the presence of an object in first and second fields of view with first and second sensors, wherein the first field of view and second field of view partly overlap to provide an overlapping coverage zone;
    measuring range to the object in the first field of view with the first sensor;
    measuring range to the object in the second field of view with the second sensor;
    determining range rate of the object with the first sensor in the first field of view;
    determining range rate of the object with the second sensor in the second field of view;
    sensing amplitude of a received signal with the first sensor;
    sensing amplitude of a received signal with the second sensor;
    estimating an azimuth angle based upon the sensed ranges and the ratio of the sensed amplitudes from the first and second sensors;
    estimating position of the object based on the estimated azimuth angle and the sensed range and range rate measurements when the object is in the overlapping coverage zone; and
    estimating velocity of the object based on the estimated azimuth angle and the sensed range and range rate measurements when the object is in the overlapping coverage zone.

10. The method as defined in claim 9 further comprising the step of tracking movement of the object through the overlapping coverage zone.

11. The method as defined in claim 10 further comprising the step of tracking movement of the object through one of the first and second fields of view outside of the overlapping coverage zone.

12. The method as defined in claim 11, wherein the step of tracking movement comprises tracking movement of the object as a function of the estimated position and velocity of the object.

13. The method as defined in claim 9, wherein the steps of estimating the position and velocity of the object comprises the use of a non-linear filter.

14. The method as defined in claim 9, wherein the steps of estimating the position and velocity of the object comprises the use of an extended Kalman filter.

15. The method as defined in claim 9, wherein the estimation of position and velocity is relative to a vehicle.

16. The method as defined in claim 9, wherein the steps of sensing the object comprises the use of a radar sensor.

17. The method as defined in claim 16, wherein the step of measuring range rate of the object comprises the use of a Doppler radar sensor.

* * * * *